United States Patent [19]

Sommer et al.

[11] 3,883,502
[45] May 13, 1975

[54] DISAZO DYESTUFFS COMPRISING PHENYL METHANE SULFONIC ACID DIAZO COMPONENT COUPLED TO PHENYL OR NAPHTHYL ANINE WHICH IS DIAZOTIZED AND COUPLES TO AN INDOLE COUPLER

[75] Inventors: Richard Sommer, Leverkusen-Schlebusch; Edgar Siegel, Leverkusen-Steinbuchel, both of Germany

[73] Assignee: Bayer Aktiengesellschaft, Leverkusen-Bayerwerk, Germany

[22] Filed: Apr. 10, 1972

[21] Appl. No.: 242,787

[30] Foreign Application Priority Data
Apr. 10, 1971 Germany............................ 2117462

[52] U.S. Cl................... 260/165; 8/41 B; 260/196; 260/197; 260/200; 260/205; 260/206; 260/319.1; 260/508
[51] Int. Cl........................ C09b 31/14; D06p 3/24
[58] Field of Search.................................... 260/165

[56] References Cited
UNITED STATES PATENTS

| | | | |
|---|---|---|---|
| 2,198,002 | 4/1940 | Dickey............................... | 260/165 |
| 2,221,029 | 11/1940 | McNally et al...................... | 260/206 |
| 3,070,592 | 12/1962 | Baumann et al.................... | 260/165 |
| 3,255,173 | 6/1966 | Dehnert et al...................... | 260/153 |

FOREIGN PATENTS OR APPLICATIONS
2,007,536  9/1971  Germany............................ 260/165

*Primary Examiner*—Floyd D. Higel
*Attorney, Agent, or Firm*—Plumley & Tyner

[57] ABSTRACT

Disazo dyestuffs are disclosed which, in the free acid form, have the formula

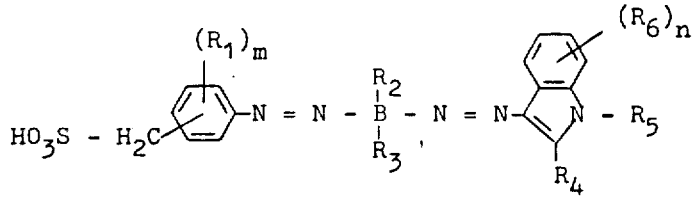

in which $R_1$ is H, Cl, Br, alkyl, alkoxy or nitro;

$R_2$ and $R_3$ are H, Cl, Br, alkoxy or alkyl;

$R_4$ is alkyl or optionally substituted aryl;

$R_5$ is H or alkyl which may be substituted by CN, carboxamide or carboxyl;

$R_6$ is a substituent, such as alkyl, alkoxy, halogen, nitro, sulpho, or cyano;

B is 1,4-phenylene or 1,4-naphthylene;

$m$ is 1 or 2; and $n$ is 0, 1 or 2.

The dyestuffs are useful in the printing and dyeing of natural and synthetic fiber materials containing amide groups to give dyeings having good fastness properties especially wet processing and light fastness.

7 Claims, No Drawings

DISAZO DYESTUFFS COMPRISING PHENYL METHANE SULFONIC ACID DIAZO COMPONENT COUPLED TO PHENYL OR NAPHTHYL ANINE WHICH IS DIAZOTIZED AND COUPLES TO AN INDOLE COUPLER

The subject-matter of the invention comprises new valuable disazo dyestuffs which in the form of the free acid correspond to the general formula

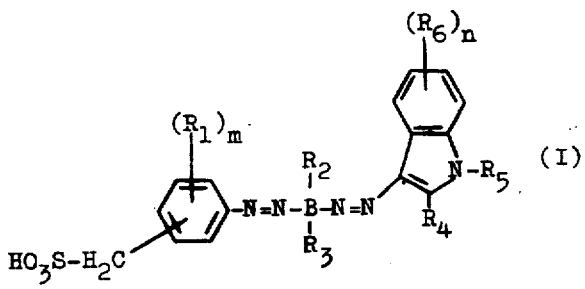

as well as their production and their use for the dyeing of synthetic fibre materials, especially those of polyamides.

In the general formula (I)

$R_1$ stands for hydrogen, chlorine, bromine, an alkyl group, an alkoxy group or a nitro group;

$R_2$, $R_3$ stand for hydrogen, chlorine, bromine, an alkoxy group or an alkyl group;

$R_4$ stands for an alkyl group which is not further substituted, or for an optionally substituted aryl group;

$R_5$ stands for hydrogen or an alkyl group which may be substituted by a nitrile, carboxamide or carboxyl group;

$R_6$ stands for a substituent, especially for alkyl, alkoxy, halogen, nitro, sulpho, cyano;

B stands for a 1,4-phenylene or 1,4-naphthylene radical;

$m$ stands for the numbers 1 – 2; and $n$ stands for the numbers 0 – 2.

The radicals $R_1$ and $R_6$ each may be identical or different.

Suitable radicals B are, for example, radicals of the formulae

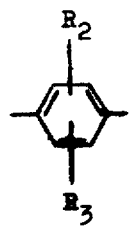 and 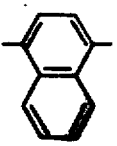

in which $R_2$ and $R_3$ have the same meaning as above. Unless otherwise stated, the alkyl and alkoxy groups may contain further substituents, for example, cyano, hydroxy or phenyl which may be further substituted. Preferred alkyl groups are those with 1 – 4 carbon atoms, such as —$CH_3$, —$C_2H_5$, —$C_3H_7$, —$C_4H_9$, —$C_2H_4CN$.

Preferred alkoxy groups are those with 1 – 6 carbon atoms such as —$OCH_3$, —$OC_2H_5$, —$OC_3H_7$, —$OC_4H_9$, —$OCH_2CH_2OH$, —$OCH_2C_6H_5$.

Suitable aryl radicals $R_4$ are primarily phenyl or naphthyl radicals such as phenyl, biphenylyl or naphthyl, which may be substituted, for example, by alkyl, especially $C_1$-$C_4$-alkyl; alkoxy, especially $C_1$-$C_4$-alkoxy; or halogen, especially chlorine or bromine.

Preferred dyestuffs are those of the formula

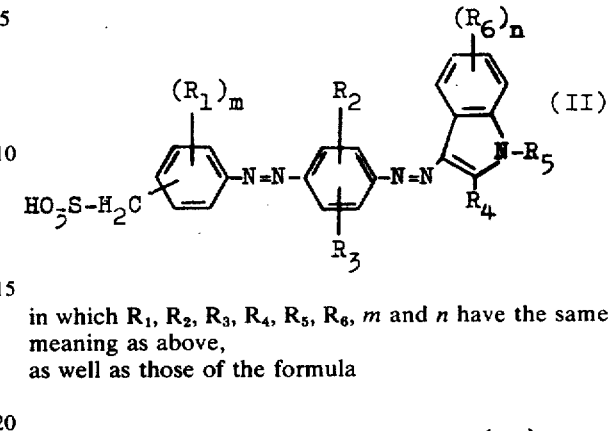

in which $R_1$, $R_2$, $R_3$, $R_4$, $R_5$, $R_6$, $m$ and $n$ have the same meaning as above, as well as those of the formula

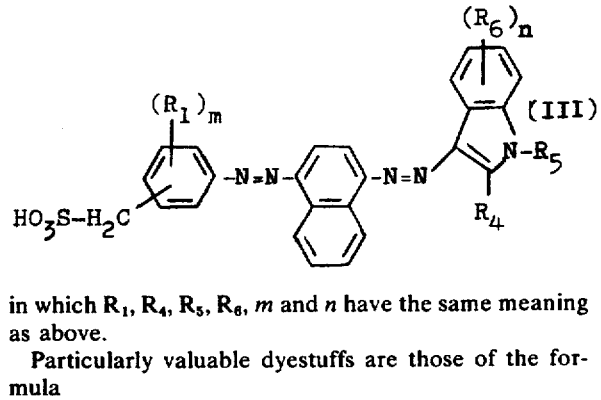

in which $R_1$, $R_4$, $R_5$, $R_6$, $m$ and $n$ have the same meaning as above.

Particularly valuable dyestuffs are those of the formula

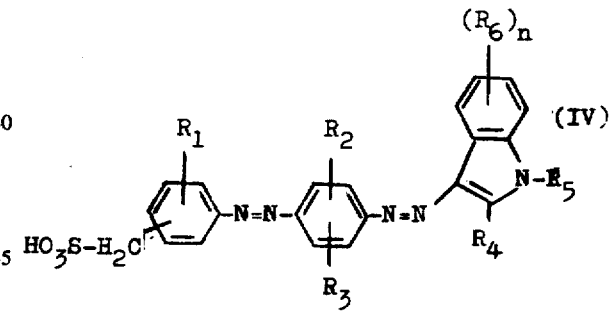

in which $R_1$, $R_2$, $R_3$, $R_4$, $R_5$, $R_6$ and $n$ have the same meaning as above,
especially those of the formula

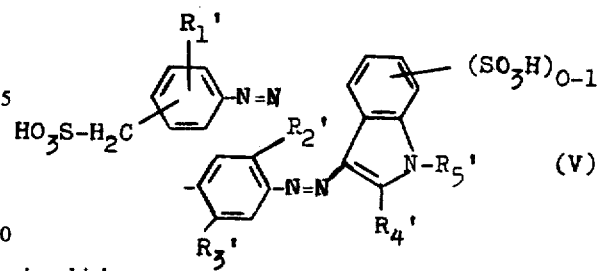

in which $R_1'$ stands for hydrogen chlorine, bromine, a methoxy or ethoxy group;

$R_2'$ stands for hydrogen, chlorine, a methyl, ethyl, methoxy or ethoxy group;

$R_3'$ stands for hydrogen, a methoxy or ethoxy, a methyl or ethyl group;

$R_4'$ stands for alkyl with 1 – 4 carbon atoms or for phenyl; and $R_5'$ stands for hydrogen or an alkyl group with 1 – 4 carbon atoms which may be substituted by a nitrile, carboxamide or carboxy group.

The dyestuffs of the formula (I) are prepared by diazotising amines of the formula

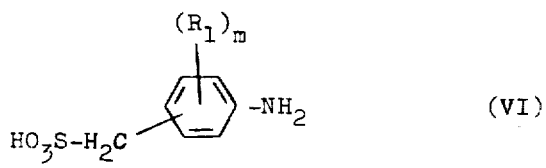
(VI)

in which $R_1$ and $m$ have the same meaning as above, and reacting the diazo compound with amines of the formula

(VII)

in which $R_2$, $R_3$ and B have the same meaning as above, and Z stands for H, $-SO_3H$ or $-CH_2SO_3H$, to form monoazo dyestuffs of the formula

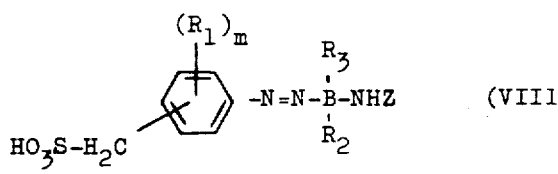
(VIII)

diazotising the resultant monoazo dyestuffs, after splitting off the groups $-SO_3H$ or $-CH_2SO_3H$ by alkaline or acidic hydrolysis, if necessary, and coupling the diazo compound with an indole of the formula

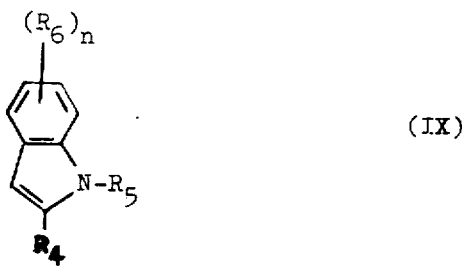
(IX)

in which $R_4$, $R_5$, $R_6$ and $n$ have the same meaning as above.

Suitable amines of the formula (VI) are, for example:
4-amino-phenyl-methane-sulphonic acid
3-amino-phenyl-methane-sulphonic acid
2-amino-phenyl-methane-sulphonic acid
2-amino-naphthalene-methane-sulphonic acid
3-amino-4-methoxy-phenyl-methane-sulphonic acid
3-amino-4-ethoxy-phenyl-methane-sulphonic acid
3-amino-6-methoxy-phenyl-methane-sulphonic acid
3-amino-6-ethoxy-phenyl-methane-sulphonic acid
4-amino-2-chloro-phenyl-methane-sulphonic acid
2-amino-4,5-dichloro-phenyl-methane-sulphonic acid
2-amino-3-bromo-5-nitro-phenyl-methane-sulphonic acid
2-amino-5-nitro-phenyl-methane-sulphonic acid
2-amino-3,5-dinitro-phenyl-methane-sulphonic acid
4-amino-3,5-dinitro-phenyl-methane-sulphonic acid.

Suitable middle components of the formula (VII) are, for example:
aniline, 2-aminotoluene, 3-aminotoluene, 2-amino-ethyl-benzene, 3-amino-ethylbenzene, 3-chloroaniline, 3-bromo-aniline, 2-aminoanisole, 3-aminoanisole, 2-amino-ethoxy-benzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene,
2-amino-1,4-dimethoxy-benzene, 2-amino-4-ethoxy-toluene,
2-amino-1,4-diethoxy-benzene, α-naphthylamine and their N-sulphonic acid or N-ω-methane-sulphonic acids.

Suitable coupling components (IX) are, for example:
2-methylindole, 2-phenylindole, 1-methyl-2-phenylindole, 1,2-dimethylindole, 1-β-cyanoethyl-2-methylindole, 1-β-cyanoethyl-2-phenylindole, β-(2-phenylindolyl-1)-propionic acid amide, β-(2-methylindolyl-1)-propionic acid amide, β-(2-methylindolyl-1)-propionic acid, 2-β-naphthylindole, 2-p-biphenylylindole, 2,5-dimethylindole, 2,4-dimethyl-7-methoxyindole, 2-phenyl-5-ethoxyindole, 2-methyl-5-ethoxy-indole, 2-methyl-5-chloro-indole, 2-methyl-6-chloro-indole, 2-methyl-5-nitroindole, 2-methyl-5-cyanoindole, 2-methyl-7-chloroindole, 2-methyl-5-fluoroindole, 2-methyl-5-bromoindole, 2-methyl-5,7-dichloroindole, 1-β-cyanoethyl-2,6-dimethylindole.

Furthermore, indole-sulphonic acids such as are described, for example, in German Pat. Specification No. 137,117, as well as other indole-sulphonic acids which are obtained in analogy with the processes described in German Pat. Specification No. 137,117 by sulphonation of 2-alkyl- or 2-aryl-indoles. Indole-5-sulphonic acids are presumably formed in this process, at least from the indoles unsubstituted in the 5-position. Examples of suitable indole-sulphonic acids are:
2-methyl-, 2-ethyl-, 2-phenyl-, 1-methyl-2-phenyl-, 1,2-dimethyl-1-ethyl-2-methyl-sulphonic acid, 1,2,5-trimethylindole-sulphonic acid, 2,5-dimethyl-indole-sulphonic acid.

The diazo components of the formula (VI) are diazotised in known manner, for example, in an acidic aqueous solution with a sodium nitrite solution at 0° – 20°C and combined with the coupling components of the formula (VII). Coupling can be carried out in the neutral to strongly acidic, but preferably in the weakly acidic pH range in an aqueous or organic-aqueous medium. The resultant monoazo dyestuffs can either be used directly, if coupling components of the formula (VII) with Z = H are used, or they can be isolated by salting out, if coupling components of the formula (VII) with Z = $SO_3H$ or $-CH_2SO_3H$ are used. In the last-mentioned case, isolation of the monoazo dyestuff has frequently to be carried out only after the amino group of the coupling component has been liberated by alkaline or acidic hydrolysis. However, an intermediate isolation of the monoazo dyestuff is not always necessary: they can also be further diazotised without isolation.

The further diazotisation of the aminoazo dyestuffs (VIII) with Z = H can be carried out, for example in an acidic aqueous dispersion with a sodium nitrite solution; the diazotisation temperatures may be comprised between 0° and 30°C. Furthermore, aminoazo dyestuffs of the formula (VIII) with Z = H can also be indirectly diazotised by dissolving them in an alkaline medium, adding a sodium nitrite solution and pouring the mixture into aqueous hydrochloric acid or adding hydrochloric acid.

Coupling of the diazotised aminoazo dyestuffs (VIII) with the end components (IX) to form the disazo dyestuffs (I) is likewise carried out in known manner, for example, in a neutral, weakly or strongly acidic medium, or also in an aqueous-organic medium. In general, the disazo dyestuffs of the formula (I) are rather sparingly soluble in an acidic medium and can be isolated by simple filtration, possibly after the addition of sodium chloride. If the dyestuffs are obtained in an impure state, they can by recrystallised in known manner from hot water, optionally with the addition of alkali. The more sparingly soluble dyestuffs (I) isolated in an acidic medium can be rendered readily water-soluble by mixing them with salts from strong bases and weak acids, for example trisodium phosphate, disodium hydrogen phosphate, sodium tetraborate, sodium metaphosphate, sodium metasilicate or sodium carbonate.

The new dyestuffs are particularly suitable for the dyeing and printing of natural and synthetic fibre materials containing amide groups, for example, those of wool, silk and polyamide such as poly-ε-caprolactam or the reaction product of hexamethylene-diamine with adipic acid. The dyeings obtained, especially those on polyamide materials, are characterised by good fastness properties, especially by good fastness to wet processing and good fastness to light.

The neutral affinity and the combination properties with regard to other suitable dyestuffs, are likewise good for this material.

In the following Examples the parts mean parts by weight and the percentages are percent by weight.

Example 1

5 Parts sodium nitrite are added to a neutral solution of 13.6 parts 3-amino-phenyl-methane-sulphonic acid in 150 parts of water. This solution is added at 0° – 10°C to 20 parts of concentrated hydrochloric acid in 150 parts of water. The resultant clear diazonium salt solution is added to a solution of 15 parts m-toludino-methane-sulphonic acid in 300 parts of water and the pH value of the coupling solution is maintained at 5 – 6 with the aid of sodium bicarbonate. After completion of the coupling, the product is salted out by the addition of sodium chloride and subsequently heated in a dilute sodium hydroxide solution at 80°C in order to split off the protective group. When the hydrolysis is completed, the aminoazo dyestuff is isolated by suction-filtration. For further diazotisation, the aminoazo dyestuff is stirred in 800 parts of water with 60 parts of concentrated hydrochloric acid, and 5 parts sodium nitrate in 30 parts of water are added at 15° – 20°C. The mixture is stirred at the same temperature for 0.5 hours, and the excess of nitrite is then destroyed by the addition of amido-sulphonic acid. The resultant solution of the diazonium salt solution is poured into a solution of 15 parts 1-methyl-2-phenyl-indole in glacial acetic acid. The mixture is somewhat buffered with sodium acetate. After completion of the coupling, the disazo dyestuff is isolated by suction-filtration. The dyestuff corresponds to the formula

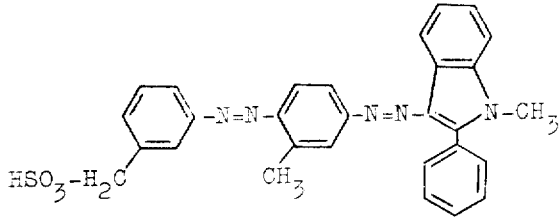

It dyes polyamide from a weakly acidic or neutral bath in yellowish orange shades. The dyeings show good fastness properties.

Dyeing Example 0.1 g of the dyestuff is dissolved hot in 100 ml of water, 5 ml of a 10% ammonium acetate solution are added, and the solution is diluted with water to a volume of 500 ml. 10 g of polyamide fibres are introduced into the dyebath, the dyebath is brought to the boil within 20 minutes, 4 ml of 10% acetic acid are added, and the bath is held at boiling temperature for 1 hour. The material is then rinsed and dried at 70° – 80°C.

Example 2

13.6 Parts 3-amino-phenyl-methane-sulphonic acid are diazotised as described in Example 1, and the product is coupled in the usual way with 9.7 parts 3-amino-4-methoxy-toluene. After completion of the coupling, the aminoazo dyestuff is isolated by suction-filtration. For further diazotisation, the dyestuff is dissolved in water with a sodium hydroxide solution at pH 8, 5 parts sodium nitrite are added, and the mixture is poured into water and hydrochloric acid in such a way that the temperature amounts to 15° – 20°C. The mixture is stirred at the same temperature for about 0.5 hours, and the excess of nitrite is then destroyed with the aid of amido-sulphonic acid. The suspension of the diazonium salt is poured into a solution of 15 parts 1-methyl-2-phenyl-indole in glacial acetic acid, and the mixture is somewhat buffered with sodium acetate. After completion of the coupling, the disazo dyestuff is isolated by suction-filtration. The dyestuff corresponds to the formula

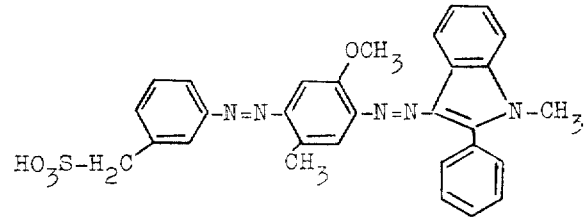

It dyes polyamide from a weakly acidic or neutral bath in red shades of very good fastness properties.

When the process is carried out as described in the preceding Examples with the use of the starting, middle and end components given in the following Table, then there are obtained further disazo dyestuffs of the general formula (I) which yield dyeings of good fastness properties on polyamide.

| Ex. | Starting component | Middle component | End component |
| --- | --- | --- | --- |
| 3 | 3-amine-phenyl-methane sulphonic acid | aniline | 2-phenyl-indole |
| 4 | ″ | ″ | 2-methyl-indole |
| 5 | ″ | ″ | 1-β-cyanoethyl-2-phenyl-indole |
| 6 | ″ | ″ | β-(2-phenyl-indolyl-1)-propionic acid amide |
| 7 | ″ | ″ | 2-phenyl-indole-5-sulphonic acid |
| 8 | ″ | ″ | 2-phenyl-5-nitro-indole |
| 9 | ″ | ″ | 2-methyl-5-chloro-indole |
| 10 | ″ | ″ | 2,5-dimethyl-indole |
| 11 | ″ | ″ | 2-methyl-7-chloro-indole |
| 12 | ″ | ″ | 1-methyl-2-phenyl-indole |
| 13 | ″ | m-toluidine | 2-methyl-indole |
| 14 | ″ | ″ | 1-β-cyanoethyl-2-phenyl-indole |
| 15 | ″ | ″ | 2,5-dimethyl-indole |
| 16 | ″ | ″ | 2-phenyl-indole-5-sulphonic acid |
| 17 | ″ | ″ | β-(2-phenyl-indolyl-1)-propionic acid amide |
| 18 | ″ | ″ | 2-methyl-7-chloro-indole |
| 19 | ″ | ″ | 2,5-dimethyl-indole |
| 20 | ″ | ″ | 2-methyl-5-chloro-indole |
| 21 | ″ | ″ | 2-phenyl-indole |
| 22 | ″ | 3-amino-4-methoxy-toluene | 1-β-cyanoethyl-2-phenyl-indole |
| 23 | ″ | ″ | 2,5-dimethyl-indole |
| 24 | ″ | ″ | 2-phenyl-indole-5-sulphonic acid |
| 25 | ″ | ″ | 1-methyl-2-phenyl-6-bromo-indole |
| 26 | ″ | ″ | 2-methyl-7-chloro-indole |
| 27 | ″ | ″ | 1-β-cyanoethyl-2,6-dimethyl-indole |
| 28 | ″ | ″ | β-(2-phenyl-indolyl-1)-propionic acid amide |
| 29 | ″ | ″ | 2-phenyl-indole |
| 30 | ″ | ″ | 2-methyl-indole |
| 31 | ″ | 3-amino-anisole | 2-phenyl-indole |
| 32 | ″ | ″ | 2-methyl-indole |
| 33 | ″ | ″ | 1-methyl-2-phenyl-indole |
| 34 | ″ | ″ | 1-β-cyanoethyl-2-phenyl-indole |
| 35 | ″ | ″ | 1-β-cyanoethyl-2-methyl-indole |
| 36 | ″ | ″ | 2-phenyl-indole-5-sulphonic acid |
| 37 | ″ | ″ | 2,5-dimethyl-indole |
| 38 | ″ | 2-amino-toluene | 2-phenyl-indole |
| 39 | ″ | ″ | 2-methyl-indole |
| 40 | ″ | ″ | 1-methyl-2-phenyl-indole |
| 41 | ″ | ″ | 2,5-dimethyl-indole |
| 42 | ″ | 3-amino-ethyl-benzene | 2-phenyl-indole |
| 43 | ″ | ″ | 2-methyl-indole |
| 44 | ″ | ″ | 1-methyl-2-phenyl-indole |
| 45 | ″ | ″ | 1-β-cyanoethyl-2-phenyl-indole |
| 46 | ″ | 2-amino-ethyl-benzene | 2-phenyl-indole |
| 47 | ″ | ″ | 2-methyl-indole |
| 48 | ″ | ″ | 1-methyl-2-phenyl-indole |
| 49 | ″ | ″ | 2-methyl-5-chloro-indole |
| 50 | ″ | ″ | 2,5-dimethyl-indole |
| 51 | ″ | ″ | 2-methyl-7-chloro-indole |

Continued

| Ex. | Starting component | Middle component | End component |
|---|---|---|---|
| 52 | '' | '' | 2-phenyl-indole-5-sulphonic acid |
| 53 | '' | 3-chloro-aniline | 2-phenyl-indole |
| 54 | '' | '' | 2-methyl-indole |
| 55 | '' | '' | 1-methyl-2-phenyl-indole |
| 56 | '' | '' | 1-β-cyanoethyl-2-phenyl-indole |
| 57 | '' | 3-bromo-aniline | 1-methyl-2-phenyl-indole |
| 58 | '' | '' | 2-phenyl-indole |
| 59 | '' | '' | 2-methyl-indole |
| 60 | '' | 2-amino-anisole | 1-β-cyanoethyl-2-phenyl-indole |
| 61 | '' | '' | 2-phenyl-indole |
| 62 | '' | '' | 2-methyl-indole |
| 63 | '' | '' | 2,5-dimethyl-indole |
| 64 | '' | 3-amino-ethoxy-benzene | 2-phenyl-indole |
| 65 | '' | '' | 1-methyl-2-phenyl indole |
| 66 | '' | '' | 1-β-cyanoethyl-2-phenyl-indole |
| 67 | '' | '' | 2-phenyl-indole-5-sulphonic acid |
| 68 | '' | '' | 2-methyl-7-chloro-indole |
| 69 | '' | '' | 2-phenyl-5-nitro-indole |
| 70 | '' | 1-amino-2,3-dimethyl-benzene | 2-phenyl-indole |
| 71 | '' | '' | 2-methyl-indole |
| 72 | '' | '' | 1-methyl-2-phenyl-indole |
| 73 | '' | 1-amino-2,5-dimethyl-benzene | 2-phenyl-indole |
| 74 | '' | '' | 1-methyl-2-phenyl-indole |
| 75 | '' | '' | 1-β-cyanoethyl-2-phenyl-indole |
| 76 | '' | '' | 2,5-dimethyl-indole |
| 77 | '' | 2-amino-4-methoxy-toluene | 2-phenyl-indole |
| 78 | '' | '' | 1-methyl-2-phenyl-indole |
| 79 | '' | '' | 2-methyl-indole |
| 80 | '' | '' | 1-β-cyanoethyl-2-phenyl-indole |
| 81 | '' | '' | β-(2-phenyl-indolyl-1)-propionic acid amide |
| 82 | '' | 2-amino-1,4-dimethoxy-benzene | 2-methyl-indole |
| 83 | '' | '' | 2-phenyl-indole |
| 84 | '' | '' | 1-methyl-2-phenyl-indole |
| 85 | '' | '' | 2-phenyl-indole-5-sulphonic acid |
| 86 | '' | '' | 2,5-dimethyl-indole |
| 87 | '' | '' | 2-methyl-7-chloro-indole |
| 88 | '' | 2-amino-4-ethoxy-toluene | 2-phenyl-indole |
| 89 | '' | '' | 2-methyl-indole |
| 90 | '' | '' | 1-methyl-2-phenyl-indole |
| 91 | '' | 2-amino-1,4-diethoxy-benzene | 2-phenyl-indole |
| 92 | '' | '' | 2-methyl-indole |
| 93 | '' | '' | 2-phenyl-indole-5-sulphonic acid |
| 94 | '' | '' | 2,5-dimethyl-indole |
| 95 | '' | '' | 1-methyl-2-phenyl-indole |
| 96 | '' | '' | 2-methyl-7-nitro-indole |
| 97 | '' | '' | 2-phenyl-5-nitro-indole |
| 98 | '' | '' | 2-methyl-5-chloro-indole |
| 99 | '' | α-naphthyl-amine | 2-phenyl-indole |
| 100 | '' | '' | 2-methyl-indole |
| 101 | '' | '' | 1-methyl-2-phenyl-indole |
| 102 | '' | '' | 2-phenyl-indole-5-sulphonic acid |
| 103 | '' | '' | 2,5-dimethyl-indole |

| Ex. | Starting component | Middle component | End component |
|---|---|---|---|
| 104 | " | " | 2-methyl-5-chloro-indole |
| 105 | " | " | 2-phenyl-5-nitro-indole |
| 106 | " | " | 1-β-cyanoethyl-2-phenyl-indole |
| 107 | " | " | β-(2-phenyl-indolyl-1)-propionic acid amide |
| 108 | 4-amino-phenyl-methane sulphonic acid | aniline | 2-phenyl-indole |
| 109 | " | " | 1-methyl-2-phenyl-indole |
| 110 | " | " | 2-methyl-indole |
| 111 | " | " | 1-β-cyanoethyl-2-phenyl-indole |
| 112 | " | " | 2,5-dimethyl-indole |
| 113 | " | " | 2-methyl-5-chloro-indole |
| 114 | " | " | 2-phenyl-indole 5-sulphonic acid |
| 115 | " | " | β-(2-phenyl-indolyl-1)-propionic acid amide |
| 116 | " | 3-amino-toluene | 2-phenyl-indole |
| 117 | " | " | 2-methyl-indole |
| 118 | " | " | 1-methyl-2-phenyl-indole |
| 119 | " | " | 1-β-cyanoethyl-2-phenyl-indole |
| 120 | " | " | 2,5-dimethyl-indole |
| 121 | " | " | 2-phenyl-5-nitro-indole |
| 122 | " | " | 2-phenyl-indole-5-sulphonic acid |
| 123 | " | 3-amino-4-methoxy-toluene | 2-phenyl-indole |
| 124 | " | " | 1-methyl-2-phenyl-indole |
| 125 | " | " | 2-methyl-indole |
| 126 | " | " | 1-β-cyanoethyl-2-phenyl-indole |
| 127 | " | " | β-(2-phenyl-indolyl-1)-propionic acid amide |
| 128 | " | " | 1-methyl-2-phenyl-6-bromo-indole |
| 129 | " | " | 2-methyl-5-chloro-indole |
| 130 | " | " | 2,5-dimethyl-indole |
| 131 | " | 3-amino-anisole | 2-phenyl-indole |
| 132 | " | " | 1-methyl-2-phenyl-indole |
| 133 | " | " | 2-methyl-indole |
| 134 | " | " | 1-β-cyanoethyl-2-phenyl-indole |
| 135 | " | " | 2,5-dimethyl-indole |
| 136 | " | " | 2-phenyl-indole-5-sulphonic acid |
| 137 | " | 2-amino-toluene | 1-methyl-2-phenyl-indole |
| 138 | " | " | 2-phenyl-indole |
| 139 | " | " | 1-β-cyanoethyl-2-phenyl-indole |
| 140 | " | 3-amino-ethyl-benzene | 2-phenyl-indole |
| 141 | " | " | 1-methyl-2-phenyl-indole |
| 142 | " | " | 1-β-cyanoethyl-2-phenyl-indole |
| 143 | " | " | 2,5-dimethyl-indole |
| 144 | " | 2-amino-ethyl-benzene | 2-phenyl-indole |
| 145 | " | " | 1-methyl-2-phenyl-indole |
| 146 | " | " | 2-methyl-indole |
| 147 | " | " | 2-phenyl-indole-5-sulphonic acid |
| 148 | " | " | 1-β-cyanoethyl-2-phenyl-indole |
| 149 | " | 3-chloro-aniline | 2-phenyl-indole |
| 150 | " | " | 1-methyl-2-phenyl-indole |
| 151 | " | " | 2-methyl-indole |
| 152 | " | " | 1-β-cyanoethyl-2-phenyl-indole |

Continued

| Ex. | Starting component | Middle component | End component |
|---|---|---|---|
| 153 | '' | 2-amino-anisole | 1-methyl-2-phenyl-indole |
| 154 | '' | '' | 2-phenyl-indole |
| 155 | '' | '' | 2,5-dimethyl-indole |
| 156 | '' | 3-amino-ethoxy-benzene | 2-phenyl-indole |
| 157 | '' | '' | 1-methyl-2-phenyl-indole |
| 158 | '' | '' | 1-β-cyanoethyl-2-phenyl-indole |
| 159 | '' | '' | 2,5-dimethyl-indole |
| 160 | '' | 1-amino-2,3-dimethyl-benzene | 2-phenyl-indole |
| 161 | '' | '' | 2-methyl-indole |
| 162 | '' | '' | 1-methyl-2-phenyl-indole |
| 163 | '' | 2-amino-1,4-diethoxy-benzene | 1-β-cyanoethyl-2-phenyl-indole |
| 164 | '' | '' | 2-phenyl-indole |
| 165 | '' | '' | 2-methyl-indole |
| 166 | '' | '' | 1-methyl-2-phenyl-indole |
| 167 | '' | '' | 2-methyl-5-chloro-indole |
| 168 | '' | α-naphthylamine | 2-phenyl-indole |
| 169 | '' | '' | 1-methyl-2-phenyl-indole |
| 170 | '' | '' | 2-methyl-indole |
| 171 | '' | '' | 1-β-cyanoethyl-2-phenyl-indole |
| 172 | '' | '' | β-(2-phenyl-indolyl-1)-propionic acid amide |
| 173 | '' | '' | 2-phenyl-indole-5-sulphonic acid |
| 174 | 2-amino-phenyl-methane-sulphonic acid | aniline | 2-phenyl-indole |
| 175 | '' | '' | 1-methyl-2-phenyl-indole |
| 176 | '' | '' | 1-β-cyanoethyl-2-phenyl-indole |
| 177 | '' | 3-amino-toluene | 2-phenyl-indole |
| 178 | '' | '' | 1-methyl-2-phenyl-indole |
| 179 | '' | '' | 2-methyl-indole |
| 180 | '' | '' | 2-phenyl-indole-5-sulphonic acid |
| 181 | '' | '' | 2,5-dimethyl-indole |
| 182 | '' | 3-amino-4-methoxy-toluene | 2-phenyl-indole |
| 183 | '' | '' | 1-methyl-2-phenyl-indole |
| 184 | '' | '' | 1-β-cyanoethyl-2-phenyl-indole |
| 185 | '' | '' | 2-methyl-5-chloro-indole |
| 186 | '' | α-naphthylamine | 2-phenyl-indole |
| 187 | '' | '' | 1-methyl-2-phenyl-indole |
| 188 | '' | '' | 1-β-cyanoethyl-2-phenyl-indole |
| 189 | '' | 2-amino-1,4-dimethoxy-benzene | 1-methyl-2-phenyl-indole |
| 190 | '' | '' | 2-phenyl-indole |
| 191 | '' | '' | 2-methyl-indole |
| 192 | '' | '' | 2-methyl-indole-5-sulphonic acid |
| 193 | '' | '' | 2,5-dimethyl-indole |
| 194 | 3-amino-4-ethoxy-phenyl-methane-sulphonic acid | aniline | 1-methyl-2-phenyl-indole |
| 195 | '' | '' | 2-phenyl-indole |
| 196 | '' | '' | 1-β-cyanoethyl-2-phenyl-indole |
| 197 | '' | '' | 2-phenyl-indole-5-sulphonic acid |
| 198 | '' | '' | 2,5-dimethyl-indole |
| 199 | '' | 3-amino-toluene | 2-phenyl-indole-5-sulphonic acid |
| 200 | '' | '' | 2-phenyl-indole |
| 201 | '' | '' | 1-methyl-2-phenyl-indole |
| 202 | '' | '' | 2-methyl-indole |
| 203 | '' | '' | 1-β-cyanoethyl-2-phenyl-indole |
| 204 | '' | 3-amino-anisole | 2-phenyl-indole |

| Ex. | Starting component | Middle component | End component |
|---|---|---|---|
| 205 | ″ | ″ | 1-methyl-2-phenyl-indole |
| 206 | ″ | ″ | 2-methyl-indole |
| 207 | ″ | ″ | 1-β-cyanoethyl-2-phenyl-indole |
| 208 | ″ | ″ | 2-phenyl-indole-5-sulphonic acid |
| 209 | ″ | ″ | 2,5-dimethyl-indole |
| 210 | ″ | α-naphthylamine | 2-phenyl-indole |
| 211 | ″ | ″ | 2-methyl-indole |
| 212 | ″ | ″ | 1-methyl-2-phenyl-indole |
| 213 | 3-amino-4-methoxy-phenyl-methane sulphonic acid | aniline | 2-phenyl-indole |
| 214 | ″ | ″ | 1-methyl-2-phenyl-indole |
| 215 | ″ | ″ | 1-β-cyanoethyl-2-phenyl-indole |
| 216 | ″ | 3-amino-toluene | 2-phenyl-indole |
| 217 | ″ | ″ | 1-methyl-2-phenyl-indole |
| 218 | ″ | ″ | 2-phenyl-indole-5-sulphonic acid |
| 219 | ″ | 3-amino-4-methoxy-toluene | 2-phenyl-indole |
| 220 | ″ | ″ | 1-methyl-2-phenyl-indole |
| 221 | ″ | ″ | 2-methyl-indole |
| 222 | ″ | ″ | 1-β-cyanoethyl-2-phenyl-indole |
| 223 | ″ | ″ | 2-phenyl-indole-5-sulphonic acid |
| 224 | ″ | α-naphthylamine | 2-phenyl-indole |
| 225 | ″ | ″ | 1-methyl-2-phenyl-indole |
| 226 | ″ | ″ | 1-β-cyanoethyl-2-phenyl-indole |
| 227 | ″ | ″ | 2-methyl-indole |
| 228 | ″ | 2-amino-1,4-dimethoxy-benzene | 2-phenyl-indole |
| 229 | ″ | ″ | 1-methyl-2-phenyl-indole |
| 230 | 3-amino-4-ethoxy-phenyl-methane sulphonic acid | 3-amino-4-methoxy-toluene | 2-phenyl-indole |
| 231 | ″ | ″ | 1-methyl-2-phenyl-indole |
| 232 | ″ | ″ | 1-β-cyanoethyl-2-phenyl-indole |
| 233 | ″ | ″ | 2-methyl-indole |
| 234 | ″ | ″ | β-(2-phenyl-indolyl-1)-propionic acid amide |
| 235 | ″ | 2-amino-1,4-dimethoxy-benzene | 2-phenyl-indole |
| 236 | ″ | ″ | 1-methyl-2-phenyl-indole |
| 237 | ″ | ″ | 2-methyl-indole |
| 238 | ″ | ″ | 1-β-cyanoethyl-2-phenyl-indole |
| 239 | ″ | 2-amino-1,4-diethoxy-benzene | 2-phenyl-indole-5-sulphonic acid |
| 240 | ″ | ″ | 2-phenyl-indole |
| 241 | ″ | ″ | 1-methyl-2-phenyl-indole |
| 242 | ″ | ″ | 1-β-cyanoethyl-2-phenyl-indole |
| 243 | ″ | ″ | 2,5-dimethyl-indole |
| 244 | ″ | ″ | 2-methyl-7-chloro-indole |
| 245 | 3-amino-phenyl-methane-sulphonic acid | m-toluidine | 1-methyl-2-phenyl-indole-sulphonic acid |
| 246 | ″ | ″ | 2,5-dimethyl-indole-sulphonic acid |
| 247 | ″ | ″ | 2-methyl-indole-sulphonic acid |
| 248 | ″ | aniline | 2-ethyl-indole-sulphonic acid |
| 249 | ″ | ″ | 1,2,5-trimethyl-indole-sulphonic acid |
| 250 | ″ | ″ | 1,2-dimethyl-indole-sulphonic acid |
| 251 | 4-amino-phenyl-methane sulphonic acid | m-toluidine | 1-ethyl-2-methyl-indole-sulphonic acid |

We claim:
1. Disazo dyestuff, which in the form of the free acid, has the formula

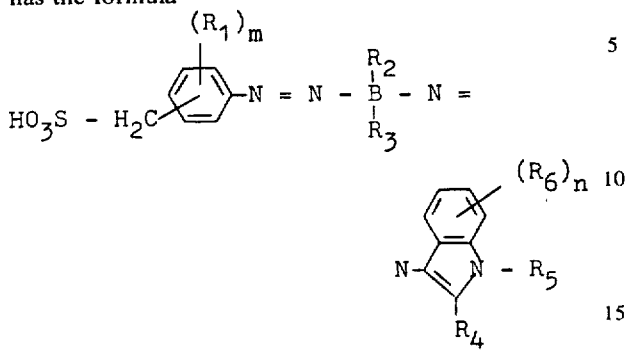

in which
B is 1,4-phenylene or 1,4-naphthylene;
$R_1$ is hydrogen, chlorine, bromine, $C_1$-$C_4$-alkyl, cyanoethyl, $C_1$-$C_6$-alkoxy, hydroxyethoxy, benzyloxy or nitro;
$R_2$ and $R_3$ are hydrogen, chlorine, bromine, $C_1$-$C_6$-alkoxy, $\beta$-hydroxyethoxy, benzyloxy, C-$C_4$-alkyl, or cyanoethyl;
$R_4$ is $C_1$-$C_4$-alkyl; phenyl; naphthyl; biphenylyl; or phenyl, naphthyl or biphenylyl substituted by $C_1$-$C_4$-alkyl, $C_1$-$C_4$-alkoxy, chlorine or bromine;
$R_5$ is hydrogen; $C_1$-$C_4$-alkyl; or $C_1$-$C_4$-alkyl substituted by cyano, carbonamido or carboxyl; $R_6$ is $C_1$-$C_4$-alkyl, cyanoethyl, $C_1$-$C_6$-alkoxy, hydroxyethoxy, benzyloxy, halogen, nitro, sulfo or cyano;
m is 1 or 2; and
n is 0, 1 or 2.

2. The disazo dyestuff of claim 1 in which

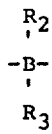

is

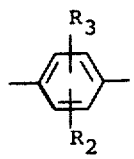

3. The disazo dyestuff of claim 1 in which

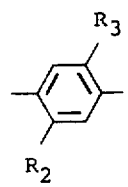

is in which
$R_1$ is hydrogen, chlorine, bromine, methoxy or ethoxy;
$R_2$ is hydrogen, chlorine, methyl or methoxy;
$R_3$ is hydrogen or methoxy;
$R_4$ is methyl or phenyl;
$R_5$ is hydrogen; $C_1$-$C_4$-alkyl; or $C_1$-$C_4$-alkyl substituted by cyano, carbonamido, or carboxyl;
$R_6$ is sulfo;
m is 1; and
n is 0 or 1.

4. The disazo dyestuff of claim 1 in which

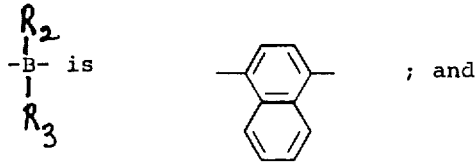

$R_2$ and $R_3$ are hydrogen.

5. The disazo dyestuff of claim 4 in which
$R_1$ is hydrogen, chlorine, bromine, methoxy or ethoxy;
$R_4$ is methyl or phenyl;
$R_5$ is $C_1$-$C_4$-alkyl; or $C_1$-$C_4$-alkyl substituted by cyano, carbonamido or carboxyl;
m is 1; and
n is 0.

6. Disazo dyestuff of claim 1 in which
$R_1$ is hydrogen, chlorine, bromine, methoxy or ethoxy;
$R_2$ is hydrogen, chlorine, methyl, ethyl, methoxy or ethoxy;
$R_3$ is hydrogen, methoxy, ethoxy, methyl or ethyl;
$R_4$ is $C_1$-$C_4$-alkyl or phenyl;
$R_5$ is hydrogen; $C_1$-$C_4$-alkyl or $C_1$-$C_4$-alkyl or $C_1$-$C_4$-alkyl substituted by cyano, carbonamido or carboxyl.

7. Disazo dyestuff of claim 6 in which n is 0.

* * * * *